Jan. 31, 1933. J. A. HANLEY 1,895,460
ELECTROMAGNETIC COIL FOR TOY ELECTRIC MOTORS
Filed Dec. 19, 1929
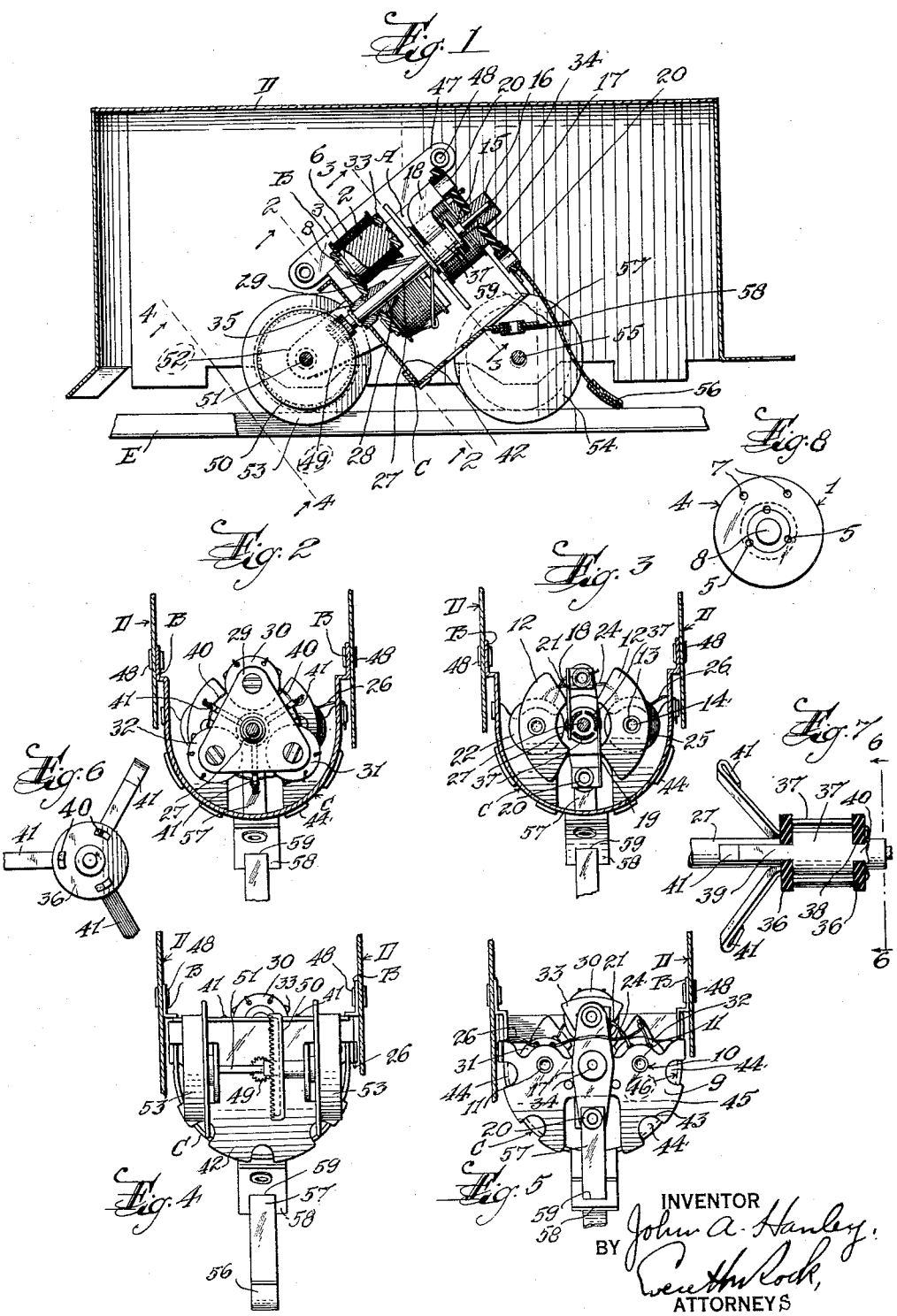

Patented Jan. 31, 1933

1,895,460

UNITED STATES PATENT OFFICE

JOHN A. HANLEY, OF IRVINGTON, NEW JERSEY

ELECTROMAGNETIC COIL FOR TOY ELECTRIC MOTORS

Application filed December 19, 1929. Serial No. 415,145.

This invention relates in general to an electric motor and more particularly to a motor especially designed for use in toys, for example electric trains, automobiles, fans and the like, and to replace the ordinary spring motors used in toys.

One object of the invention is to provide an electromagnetic coil for an electric motor embodying novel and improved features of construction whereby the motor can be manufactured at low cost so as to be adaptable for use in inexpensive toys and wherever an inexpensive small power electric motor is desired.

Other objects are to provide a novel and improved electromagnetic coil unit for electric motors and the like including means for mounting the coil on a support, for example, to form the stator or field and rotor or armature of a motor, and to obtain other advantages and results as will be more fully brought out by the following description.

Referring to the accompanying drawing in which corresponding and like parts are designated by the same reference characters, Figure 1 is a vertical longitudinal sectional view through an electric motor embodying my invention, showing the same applied to a toy railway car.

Figure 2 is a transverse vertical sectional view taken on the line 2—2 of Figure 1.

Figure 3 is a similar view taken on the line 3—3 of Figure 1.

Figure 4 is an end elevation of the motor and its casing viewed from the line 4—4 of Figure 1.

Figure 5 is a similar view of the opposite end of the motor and its casing.

Figure 6 is an enlarged end view of the commutator.

Figure 7 is a top plan view of the commutator with the end rings shown in section for clearness in illustration, and Figure 8 is an end view of one of the coils.

Specifically describing the illustrated embodiment of the invention, the reference character A generally designates the stator or field of the motor, and B the rotor or armature. Both the field A and the armature B include a plurality of identical coils 1 each of which comprises a solid cylindrical core 2 shouldered at each end as at 3 to receive fiber or other insulating end plates 4 which are held upon the core by metal displaced from the core over the outer sides of the plates as by punch marks 5. Wound upon the core between the end plates is a coil 6 of suitable wire the extremities of which pass outwardly through the apertures 7 in one of the end plates. The cores have reduced portions 8 at their ends for securing the coils to their mountings and shoes upon the coils.

The stator A includes two coils which are mounted upon a plate 9 by inserting one reduced end 8 through openings 10 in the plate and upsetting said ends as at 11. To the reduced portions of the other ends of the cores are connected shoes 12 which have tapered openings 13 receiving reduced portions which are spread or expanded into the openings as at 14. Mid-way between the coils of the stator, the plate 9 is formed with an opening 15 in which is secured a bearing bushing 16 between a shoulder on which and the plate 9 is arranged a brush support 17. The bearing bushing 16 acts as a rivet for securing the brush support to the plate 9 and also for securing itself in said plate. Brushes 18 and 19 are secured to opposite ends of the brush support 17 in any suitable manner, as by hollow rivets 20. One terminal 21 of one coil 22 is connected to the brush 18, while the other terminal 23 of the coil 22 is connected to one terminal 24 of the other coil 25. The other terminal 26 of the coil 25 is grounded upon the plate 9.

The rotor of the armature B is mounted on a shaft 27 and includes a sleeve 28 fast upon the shaft and to which is secured a coil supporting plate 29. Three of the coils 30, 31 and 32 are mounted on the coil supporting plate 29 in the same manner in which the coils 22 and 25 are mounted upon the plate 9, and each of the coils has a shoe 33 connected thereto in the identical manner in which the shoes 12 are connected to the coils 22 and 25 of the stator. The coils are circumferentially arranged about the shaft, and the radial distance between the axis of the shaft 38 and the centers of the coils 30, 31 and 32 is the same as the distance between the axis of the bushing 16 of the stator and the centers of the coils 22 and 25; and in assembling the motor one end 34 of the shaft 28 is inserted in the bushing 16, while the other end is arranged in a bearing 35 mounted in a fixed support, such as a casing C to be hereinafter described.

Mounted upon the shaft 27 to cooperate with the brushes 18 and 19 is a commutator which includes two end rings 36 formed of insulating material such as fiber, between which are arranged three commutator segments 37 identical in construction. Each of the end rings 33 has three circumferentially spaced openings 38, and each commutator segment has at its end reduced extensions 39 and 40 each passing through one of the openings 38 in one of the end rings. One of the extensions, the extension 40, is upset so as to secure the end ring thereto, while the other extensions project upwardly between the coils 30, 31 and 32 as shown in Figures 1 and 2 of the drawing. Each of the extensions 39 has one terminal of each of two adjacent coils connected thereto by passing the terminal wires through a loop 41 formed by returning the end of the extension, and thereafter twisting the ends of the wires. The commutator is arranged between the brushes 18 and 19 and frictionally engaged thereby as usual, and the connection of the extensions 39 and 40 to the terminal wires of the coils serves both to electrically connect the coils to the commutator segments and hold the commutator against rotative and longitudinal movement on the shaft.

Preferably the stator and rotor are mounted in a casing C which is substantially semi-circular in cross section, with one end 42 in which the bearing 35 is mounted. Each end of the casing has a plurality of notches and ears 43 and 44 which cooperate respectively with lugs and notches 45 and 46 on the end plates 2 and 49 of the motor. When the end plate is applied to the end of the casing and the ears 44 on the casing are bent over the end plate, the motor is securely mounted in the casing. The casing also has ears 47 for attaching it to a hollow toy, for example, a toy railway car D, as by means of rivets 48.

One end of the shaft 27 carries a pinion 49 for meshing with a gear 50 mounted on a shaft 51 journaled in bearing arms 52 which are stamped outwardly from the end 42 of the casing. The shaft 51 corresponds to the driven shaft of the toy or the like to which the motor is applied, for example, in the present instance, a toy car which has wheels 53 mounted on the shaft 51 and wheels 54 on another shaft 55.

The motor may be connected in an electric circuit in any suitable manner, but where the motor is to be used with a toy railway or cars, a third rail or contact shoe 56 may be mounted on the end of a resilient conductor strip 57 connected to the brush 19 by the same rivet 20 which connects the brush to the brush support 17. For limiting movement of the spring strip 57, an insulating extension 58 may be connected to the casing and formed with an opening 59 through which the strip 57 passes. When the car is mounted on tracks E of known construction, the contact shoe 56 frictionally bears against one of the rails under the influence of the spring strip 57, and the circuit is continued by the brushes and stator coils, the car and one of the other rails E, as is known to those skilled in the art.

It will be observed that in operation, the coils of the stator and rotor are in opposed endwise relation whereby the magnetic pull between the coils of the stator or field and rotor or armature is angular with respect to the axis of the shaft, instead of tangential as where the armature is rotatable inside the field. The motor in general corresponds to the Farraday type.

The motor is designed to operate on low voltage and will run equally well on battery current or transformer current. It requires a relatively small amount of space and its generally cylindrical or round construction admits of its use for many different purposes. The coil units have a wide range of use aside from the motor, for example in bells, buzzers, and other electrical apparatus requiring small electro-magnets. By changing the size of the wire and the number of turns in the field or armature, or both, a wide range of variations in results can be obtained.

While I have shown and described the invention as embodied in the now preferred construction, it will be understood that this is primarily for the purpose of illustrating the principles of the invention and that many modifications and changes may be made in the details of construction without departing from the spirit or scope of the invention.

Having thus described my invention, what I claim is:

An electromagnetic coil for motors and the like comprising a solid iron core having a shoulder at each end and a reduced end portion outwardly of said shoulder, an insulating end plate mounted against each said shoulder and held on said core by metal upset over the end plate from said core, a helical winding of wire between said end plates on said core, and a shoe having an opening to receive one reduced end portion of the core which is upset to secure the shoe on the core, the other reduced end serving to secure the coil upon a support.

JOHN A. HANLEY.